(12) United States Patent
Chen et al.

(10) Patent No.: US 8,309,190 B2
(45) Date of Patent: Nov. 13, 2012

(54) ROTATIONAL MOLDED ARTICLE FORMED FROM HIGH MOLECULAR WEIGHT POLYAMIDES

(75) Inventors: John C. Chen, Malvern, PA (US); Barbara Ramfel, Barc (FR); Bruce Clay, Boyertown, PA (US); William Todd Rogers, Collegeville, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 13/203,260

(22) PCT Filed: Feb. 24, 2010

(86) PCT No.: PCT/US2010/025165
§ 371 (c)(1),
(2), (4) Date: Aug. 25, 2011

(87) PCT Pub. No.: WO2010/099155
PCT Pub. Date: Sep. 2, 2010

(65) Prior Publication Data
US 2012/0027971 A1    Feb. 2, 2012

Related U.S. Application Data

(60) Provisional application No. 61/155,579, filed on Feb. 26, 2009.

(51) Int. Cl.
*B29D 22/00* (2006.01)
*B29D 23/00* (2006.01)
*B32B 1/08* (2006.01)

(52) U.S. Cl. .................. 428/35.7; 428/36.9; 428/36.92; 428/474.4; 428/475.5

(58) Field of Classification Search ................ 428/35.7, 428/36.9, 36.92, 474.4, 475.5; 264/310; 528/310
See application file for complete search history.

(56) References Cited

U.S. PATENT DOCUMENTS

| | | |
|---|---|---|
| 5,420,198 A | 5/1995 | Papazoglou et al. |
| 6,143,862 A | 11/2000 | Blondel et al. |
| 6,746,757 B1 | 6/2004 | Takagi et al. |

*Primary Examiner* — Michael C Miggins
(74) *Attorney, Agent, or Firm* — Thomas F. Roland

(57) ABSTRACT

The invention relates to an article formed by a rotational molding process, having at least one layer formed from a high molecular weight polyamide. The high molecular weight polyamide is one having a molecular weight in the range of 20,000 to 35,000 and also having an inherent viscosity of 1.05-1.60 dL/g. Rotomolded articles having a high molecular weight polyamide layer have better low-temperature impact performance compared to articles formed from lower molecular weight polyamides.

14 Claims, No Drawings

1

ROTATIONAL MOLDED ARTICLE FORMED FROM HIGH MOLECULAR WEIGHT POLYAMIDES

FIELD OF THE INVENTION

The invention relates to an article formed by a rotational molding process, having at least one layer formed from a high molecular weight polyamide. The high molecular weight polyamide is one having a molecular weight in the range of 20,000 to 35,000 and/or having an inherent viscosity of 1.05-1.60 dL/g. Rotomolded articles having a high molecular weight polyamide layer have better low-temperature impact performance compared to articles formed from lower molecular weight polyamides.

BACKGROUND OF THE INVENTION

Rotomolding is used for the manufacture of simple to complex, hollow plastic products. It can be used to mold a variety of materials such as polyethylene, polypropylene, polycarbonate, polyamide, or polyvinyl chloride (PVC). In the rotomolding process, a polymer powder is placed inside a mold having the outer shape of the desired hollow product. The mold is constantly rotated in three-dimensions while being heated. The polymer powder adheres to the heated mold once the mold temperature is above the polymer melting point, producing a relatively uniform polymer layer on the entire inner surface of the mold, resulting in a hollow object the same shape as the mold. A multi-layer object can be produced by adding a second polymer to the mold after the mold is coated with the first layer.

It is often desirable to form a multi-layer rotationally molded article, to combine the attributes of two different polymeric materials.

Medium density polyethylene is preferably used in rotomolding processes, although crosslinked polyethylene may also be used. Polyethylene represents more than 80 percent of the polymers used in the rotomoulding market. This is due to the outstanding resistance of polyethylene to thermal degradation during processing, to its high resistance to alcohols, to its easy grinding, good flowability, and low temperature impact properties.

Polyamides are useful in rotomolded objects due to their high resistance to hydrocarbon permeability and excellent chemical resistance.

Polyamides used in rotomolding are generally of lower molecular weight and lower inherent viscosity. Conventional wisdom was that resin grades with molecular weights (Mw) higher than 20,000 and inherent viscosities higher than 1.05 dL/g are not normally perceived as being rotomoldable. The problem with the lower molecular weight and/or lower inherent viscosity polyamides is that the low temperature impact strength is not satisfactory for many end-use applications. For lateral impact testing of motorcycle tanks (for example, in SAE J1241), a pendulum weighing between 80 lb. and 160 lb. is released from a height sufficient to produce 450 Nm±10 Nm (4000 in-lb±100 in-lb) of kinetic energy at impact. Any tank damage resulting in external leakage in excess of 30 cc/min (1 fl. oz./min.) is considered a failure. Tanks made with lower molecular weight and/or lower inherent viscosity polyamides generally do not consistently pass this test.

One method to improve the low temperature impact strength of polyamides can be by the addition of one or more impact modifiers. However for some applications (e.g., fuel containment), the addition of impact modifiers can detrimentally affect certain properties (e.g., reduced resistance to fuel permeation).

There is need for a polyamide that can be used in a rotomolding process, which provides better low-temperature impact strength than currently used polyamides.

Surprisingly it has been found that high molecular weight and high viscosity polyamides can be successfully rotomolded into monolithic or multi-layer articles, and these articles have superior low temperature impact strength.

SUMMARY OF THE INVENTION

The invention relates to a rotationally-molded article having a high-impact polyamide layer comprising a polyamide having a weight average molecular weight of greater than 20,000 g/mol and an inherent viscosity of 1.05 dL/g or greater. The article has excellent low-temperature impact strength.

DETAILED DESCRIPTION OF THE INVENTION

The invention relates to the use in a rotomolding process of a high molecular weight, high viscosity polyamide, to provide improved low temperature impact properties articles. The article formed can have a mono-layer or multi-layer structure. In a multi-layer structure, the high molecular weight polyamide could be on the inside or the outside of the structure.

The polyamides of the invention have high weight average molecular weight of from 20,000 to 35,000, preferably from 20,000 to 30,000, and also a high inherent viscosity of from 1.05-1.60 dL/g, and preferably from 1.10 to L40 dL/g.

Polyamides useful in the invention include, but are not limited to the products of condensation:

of one or more amino acids such as aminocaproic acid, 7-aminoheptanoic acid, 11-aminoundecanoic acid and 12-aminododecanoic acid of one or more lactams such as caprolactam, oenantholactam and lauryllactam;

of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid.

It is also possible to use copolyamides. Mention may be made of the copolyamides resulting from the condensation of at least two $\alpha,\omega$-aminocarboxylic acids or of two lactams or of one lactam and one $\alpha,\omega$-aminocarboxylic acid. Mention may also be made of the copolyamides resulting from the condensation of at least one $\alpha,\omega$-aminocarboxylic acid (or a lactam), at least one diamine and at least one dicarboxylic acid. Preferred polyamides include PA-6,12 and PA-6,66.

It is possible to polymerize the polyamide in-situ in the rotomolder—such as PA-6. Preferred polyamides include PA6; PA-11; PA12; PA-6,6; polyamide diamine; and copolyamides PA-6,12; PA-6,9; PA-6,10; PA-6,11; PA-4,6; and PA-6,611; polyetherblock amides; PA-6,66; and mixtures thereof. Especially preferred are PA-6; PA-11; and PA-12.

The high molecular weight polyamide may be impact-modified. Supple modifiers may be, for example, functionalised polyolefins, grafted aliphatic polyesters, optionally grafted copolymers containing polyether blocks and polyamide blocks, copolymers of ethylene and of an alkyl (meth) acrylate and/or of a saturated vinylcarboxylic acid ester, and plasticizers such as, but not limited to, butylbenzene sulfoanamide. The modifier may also be a polyolefin chain with polyamide grafts or polyamide oligomers thus having affinities with the polyolefins and the polyamides. The supple modifier may also be a block copolymer. The impact modifier may be present at from 0-50 weight percent, based on the polyamide solids, preferably from 0-25 weight percent.

The high molecular weight polyamide layer could also contain other polymers compatible/miscible with the high molecular weight polyamide. The high molecular weight polyamide makes up from 50-100 weight percent of the high impact layer, preferably from 70-100 weight percent, and more preferably from 80-100 percent. In one embodiment, lower molecular weight (<20,000 g/mol) polyamides of the same or different chemistry are blended with the high molecular weight polyamide. In another embodiment, small amounts of polyethylene and/or copolymers containing polyether blocks and polyamide blocks are blended into the high impact layer.

When forming rotomolded articles with lower molecular weight polyamides, it is sometimes desired or necessary to add mineral oil and/or plasticizer to the polyamide powder, in order to improve the mold release properties and/or improve the impact properties of the article, respectively. Unfortunately, plasticizer can be leached out by fuel, sometimes resulting in precipitates that can potentially clog the fuel filter or fuel injectors, and mineral oil can disrupt the powder flow. Preferably, the articles of the present invention are formed without any added plasticizer or mineral oil. The higher molecular weight polyamides of the invention provide better low temperature impact modification and show no need for mold release agents within the powder itself, so no plasticizer or mineral oil is needed.

In a multi-layer rotational molded article, the high molecular weight polyamide can be placed on either the interior, exterior, or middle in the case of tanks having three or more layers. The other layer can be any material usable in a rotational molding process, including but not limited to lower molecular weight polyamides and copolyamides, polyesters such as polybutylene terephalate, fluoropolymers such as polyvinylidene fluoride polymers, copolymers and terpolymers, ethylene-tetrafluoroethylene copolymers, acrylic and methacrylic polymers and copolymers, polyacetals, polyether block amides, liquid crystal polymer, homopolymers or copolymers of ethylene, propylene, polyamide, functional polyolefins, polyesters, functionalized acrylics, polyethylene terephthalate or butylene terephthalate, liquid crystal polymer, polycarbonates, acrylics, polyamides, aromatic or aliphatic polyketones, polyether ketones, polyethylene vinyl alcohol, polyphenylene sulfides as well as blends or alloys of these materials.

In a preferred embodiment, the rotomolded article is a multi-layer structure having a layer of the high molecular weight polyamide of the invention, and a layer of medium density polyethylene and/or crosslinked polyethylene.

Based on −20° C. and −40° C. Drop Dart Impact results, high molecular weight (Mw=20,000-30,000) and high viscosity (inherent viscosity 1.05-1.40 dL/g) polyamides are shown to improve the low temperature impact strength of rotationally molded parts significantly compared to their lower molecular weight (Mw<20,000) and/or lower viscosity (inherent viscosity<1.05 dL/g) counterparts. Mean failure energies in ARM Drop Dart Impact Testing (Association of Rotational Molders International Low Temperature Impact Test, Version 4.0—July 2003) of at least 100 ft-lbs (at −20 C) and/or at least 50 ft-lbs (at −40 C) for a bilayer part consisting of a 4 mm thick layer of medium density polyethylene and a 2 mm thick layer of high molecular weight and/or high viscosity polyamide are typical for this invention. In contrast, the prior art typically provides mean failure energies of less than 70 ft-lbs (at −20 C) and/or less than 40 ft-lbs (at −40 C) for a bilayer part consisting of a 4 mm thick layer of medium density polyethylene and a 2 mm thick layer of low molecular weight (Mw<20,000) and/or low viscosity (inherent viscosity<1.05 dL/g) polyamide.

Rotationally molded articles of the invention may be used in many applications, including, but not limited to fuel tanks for cars and lorries with a size ranging from 40 L to 600 L. The rotationally molded articles of the invention may be complex or simple structures.

Unless otherwise indicated, all percentages are weight percentages and all molecular weights are weight average molecular weight.

EXAMPLES

Example 1

The average energy at maximum load was measured at −20° C. according to ASTM D3763 for monolayer samples (3.1 mm thickness) of low molecular weight (Mw<20,000) and low viscosity (inherent viscosity<1.05 dL/g) polyamide 11 as well as high molecular weight (Mw>20,000) and high viscosity (inherent viscosity>1.05 dL/g) polyamide 11. The results are shown in Table 1 (each value represents an average of nine samples). The lower Average Energy at Maximum Load and higher standard deviation exhibited by the low molecular weight polyamide 11 can be attributed to the fact that 90% of the tested samples showed unfavorable brittle behavior. In contrast, the higher Average Energy at Maximum Load and lower standard deviation exhibited by the high molecular weight polyamide 11 can be attributed to the fact that 100% of the tested samples showed favorable ductile behavior.

TABLE 1

| | Average Energy at Maximum Load (J) | Standard Deviation |
|---|---|---|
| Low Mw Polyamide 11 | 11.5 | 13.6 |
| High Mw Polyamide 11 | 26.0 | 3.6 |

What is claimed is:

1. A rotationally-molded article having a high-impact polyamide layer comprising a polyamide having a weight average molecular weight of greater than 20,000 g/mol and an inherent viscosity of 1.05 dL/g or greater, wherein said article has a mean failure energy of at least 100 ft-lbs at −20° C. in an ARM Drop Dart Impact Test, and/or an Average Energy at Maximum Load of at least 40 J at −2° C. in ASTM D3763 High Speed Puncture Testing for bi-layer article having a 4 mm thick layer of medium density polyethylene and a 2 mm thick layer of said high impact polyamide; and wherein no plasticizer or mineral oil is added.

2. The rotationally-molded article of claim 1, wherein the molecular weight is in the range of 20,000-35,000 g/mol.

3. The rotationally-molded article of claim 1, wherein the inherent viscosity is in the range of from 1.05-1.60 dL/g.

4. The rotationally-molded article of claim 1, wherein the molecular weight is in the range of 20,000-30,000 g/mol, and the inherent viscosity is in the range of from 1.10-1.40 dL/g.

5. The rotationally-molded article of claim 1, wherein said polyamide is selected from the group consisting of PA-6; PA-6,6; PA-6,10; PA-6,12; PA-4,6; PA-11, and PA-12, and blends thereof.

6. The rotationally-molded article of claim 1, further comprising low molecular weight (<20,000 g/mol polyamide that is chemically the same or different than the high molecular weight polyamide, wherein said low molecular weight polyamide is blended with the high molecular weight polyamide, and wherein the high molecular weight polyamide represents from 50 to 100 weight percent of the total polyamide.

7. The rotationally-molded article of claim 1, further comprising from 0 to 50 weight percent of one or more impact modifiers, based on the polyamide solids.

8. The rotationally molded article of claim 1, wherein said article has an Average Energy at Maximum Load of at least 20 J at −20° C. in ASTM D3763 High Speed Puncture Testing for a monolayer article consisting of a 3.1 mm thick layer of said high impact polyamide.

9. The rotationally molded article of claim 1, wherein said article is a multi-layer article.

10. The rotationally molded article of claim 1, wherein said high impact polyamide layer is the innermost layer of the article.

11. The rotationally molded article of claim 1, wherein said high impact polyamide layer is the outermost layer of the article.

12. The rotationally molded article of claim 1, wherein said high impact polyamide layer is the intermediate layer of an article consisting of three or more layers.

13. The rotationally molded article of claim 1, wherein said high impact polyamide contains no impact modifier.

14. The rotationally molded article of claim 1, wherein said high impact polyamide contains no plasticizer and/or mold release agent.

* * * * *